United States Patent
Dondeti et al.

(10) Patent No.: US 12,175,755 B2
(45) Date of Patent: Dec. 24, 2024

(54) METHOD AND SYSTEM FOR AUTOMATICALLY CREATING LOOP VIDEOS

(71) Applicants: Lakshminath Reddy Dondeti, San Jose, CA (US); Vidya Narayanan, San Jose, CA (US)

(72) Inventors: Lakshminath Reddy Dondeti, San Jose, CA (US); Vidya Narayanan, San Jose, CA (US)

(73) Assignee: SILVERLABS TECHNOLOGIES INC, San Jose, CA (US)

( * ) Notice: Subject to any disclaimer, the term of this patent is extended or adjusted under 35 U.S.C. 154(b) by 0 days.

(21) Appl. No.: 18/197,036

(22) Filed: May 13, 2023

(65) Prior Publication Data

US 2023/0368533 A1    Nov. 16, 2023

Related U.S. Application Data

(60) Provisional application No. 63/341,425, filed on May 13, 2022.

(51) Int. Cl.
| | |
|---|---|
| G06V 10/28 | (2022.01) |
| G06F 3/0482 | (2013.01) |
| G06V 20/40 | (2022.01) |
| G11B 27/30 | (2006.01) |
| G11B 27/34 | (2006.01) |

(52) U.S. Cl.
CPC ............ G06V 20/46 (2022.01); G06F 3/0482 (2013.01); G06V 10/28 (2022.01); G11B 27/30 (2013.01); G11B 27/34 (2013.01)

(58) Field of Classification Search
CPC ...... G06V 20/46; G06V 10/28; G06F 3/0482; G11B 27/30; G11B 27/34
See application file for complete search history.

(56) References Cited

U.S. PATENT DOCUMENTS

| | | | | |
|---|---|---|---|---|
| 2010/0223128 | A1* | 9/2010 | Dukellis | H04N 23/667 715/810 |
| 2014/0233919 | A1* | 8/2014 | Sabatino | G11B 27/036 386/285 |
| 2018/0040349 | A1* | 2/2018 | Xie | G11B 27/036 |
| 2018/0192108 | A1* | 7/2018 | Lyons | G06F 16/219 |
| 2018/0295427 | A1* | 10/2018 | Leiberman | H04N 21/8456 |

\* cited by examiner

*Primary Examiner* — Thai Q Tran
*Assistant Examiner* — Jose M Mesa

(57) ABSTRACT

Exemplary embodiments of the present disclosure are directed towards method and system for automatically creating loop videos comprising a computing device comprising an automated loop video creating module configured to enable a user to access a special icon for using one or more pre-designed loop video templates. The automated loop videos creating module configured to allow the user to access and select a music track from music tracks library and enable user to record video segments on pre-designed loop video templates. The server comprising an automated loop videos processing module configured to receive and process user recorded one or more video segments. The automated loop videos processing module configured to identify similarity of foreground regions among extracted video frames and generate a final loop video by merging user recorded video segments. The automated loop videos creating module configured to receive final loop video and display to user on computing device.

20 Claims, 8 Drawing Sheets

METHOD AND SYSTEM FOR AUTOMATICALLY CREATING LOOP VIDEOS

CROSS-REFERENCE TO RELATED APPLICATIONS

This patent application claims priority benefit of U.S. Provisional Patent Application No. 63/341,425, entitled "METHOD AND APPARATUS FOR AUTOMATICALLY CREATING LOOP VIDEOS WITHOUT COMPLEX EDITING", filed on 13 May 2022. The entire contents of the patent application are hereby incorporated by reference herein in its entirety.

COPYRIGHT AND TRADEMARK NOTICE

This application includes material which is subject or may be subject to copyright and/or trademark protection. The copyright and trademark owner(s) have no objection to the facsimile reproduction by any of the patent disclosure, as it appears in the Patent and Trademark Office files or records, but otherwise reserves all copyright and trademark rights whatsoever.

TECHNICAL FIELD

The present invention relates to automatically providing a loop point on a recorded video and enabling the video to start playing from the loop point and thereby loop continuously. Secondly, it relates to a user being able to imitate the act in a Loop video template and thus getting rid of the effort involved in coming up with a creative script required for a loop video. Thirdly, it relates to the feature being able to automatically stop recording the video at the end of each segment in the case where the creator is recording on a multiple-segment Loop video template. Lastly, it relates to adding a loop point on a video recorded with a soundtrack synced from the music tracks library.

BACKGROUND

Nowadays, loop videos have become more popular, particularly in the context of video-sharing services and social networks. Generally, loop videos consist of a sequence of frames that are repeated, creating the illusion of continuous motion. They are typically short, ranging from six to fifteen seconds, and are widely used in various domains, including digital marketing, music clips, art, and social media. The appeal of loop videos lies in their ability to capture key scene dynamics in a concise, portable, and shareable format. They convey a richer meaning than a single photograph while being more efficient to view, as users can automatically review the key scene dynamics by watching the repeated sequence.

Conventionally, loop videos are created by cutting a short clip from a longer video. However, this approach often results in abrupt changes between the last and first frames, leading to a jarring viewing experience. Some techniques attempt to mitigate this issue by playing the video back and forth, concatenating a copy of the video in reverse order. While this reduces location-related abruptness, it still fails to address abrupt changes in motion and can even introduce unrealistic motions due to time reversal.

In contrast, professional artists, animators, photographers, and creators manually create seamless loop videos by recording a video on a script that is suitable for looping and trying to match the last frame of the recording with the first frame of the recording. Alternatively, creators edit the video in a video editor where it is broken into two segments and rearranged at a point where smooth looping is achieved in the resulting video. These edits may also include adding an effect at the point where the segments are re-arranged. In the case of recording which involves dialogues, cropping multiple portions of the video into segments and rearranging them might be required. However, these manual techniques are time-consuming and require specialized knowledge and tools. They are often impractical for casual video footage, especially when dealing with videos containing complex motion. The technical problem at hand is the lack of an automated solution that enables the creation of high-quality loop videos without the need for tedious manual editing. Existing techniques are either insufficient in addressing abrupt changes or are highly specialized, limiting the widespread adoption and accessibility of loop videos.

In the light of the aforementioned discussion, there exists a need for a certain system and method for automatically creating loop videos with novel methodologies that would overcome the above-mentioned challenges.

SUMMARY

The following invention presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An objective of the present disclosure is directed towards a method and system for automatically creating loop videos.

Another objective of the present disclosure is directed towards a system that eliminates the need for complex editing software or specialized skills thereby, making loop video creation more accessible to a wider range of users.

Another objective of the present disclosure is directed towards a system that allows a user, including professional artists, animators, photographers, and creators, to effortlessly generate high-quality loop videos without the need for tedious manual editing.

Another objective of the present disclosure is directed towards a system that identifies loop points, seamlessly combines video segments, and ensures smooth transitions and natural motions.

Another objective of the present disclosure is directed towards a system that allows the user to effortlessly produce visually appealing and engaging content suitable for various domains, including digital marketing, music clips, art, and social media.

Another objective of the present disclosure is directed towards enabling the user to create or record videos on a computing device for automatically creating loop videos.

Another objective of the present disclosure is directed towards enabling the user to upload offline recorded videos on the computing device for automatically creating loop videos.

Another objective of the present disclosure is directed towards a system that allows the user to create loop videos with far less effort.

Another objective of the present disclosure is directed towards a system that identifies loop points in recorded videos and eliminates the need for manual rearrangement of video segments.

Another objective of the present disclosure is directed towards a system that enables the user to select a music track on the computing device to create loop videos.

Another objective of the present disclosure is directed towards a system that enables the user to record the videos in a hands-free mode for automatically creating loop videos.

Another objective of the present disclosure is directed towards a system that removes the need to crop any unnecessary aspects.

Another objective of the present disclosure is directed towards a system that allows the user to mark their custom looping points on the recorded video.

Another objective of the present disclosure is directed towards a system that allows the user to imitate acts or performances depicted in pre-designed loop video templates thereby, reducing the effort required to come up with a creative script.

Another objective of the present disclosure is directed towards a system that simplifies the video creation process, saves time and effort, and enhances the overall viewing experience of loop videos.

Another objective of the present disclosure is directed towards a system that allows the user to create various types of loop videos using different loop video templates. For example, one class of loop videos involves a person appearing and disappearing on-screen infinitely.

Another class of loop videos includes acts performed repeatedly, such as an infinite ball juggling act where the creator juggles the balls multiple times.

Another objective of the present disclosure is directed towards a system that significantly reduces the complexity and effort required to create captivating loop videos.

According to an exemplary aspect of the present disclosure, enabling a user to access a special icon to access pre-designed loop video templates for creating loop videos on a computing device by an automated loop videos creating module.

According to another exemplary aspect of the present disclosure, redirecting the user to a track screen and displaying a music tracks library to the user on the track screen by the automated loop videos creating module.

According to another exemplary aspect of the present disclosure, allowing the user to access and select a music track from the music tracks library by the automated loop videos creating module.

According to another exemplary aspect of the present disclosure, enabling the user to record one or more video segments on the pre-designed loop video templates by the automated loop videos creating module.

According to another exemplary aspect of the present disclosure, transferring the user-recorded one or more video segments to a server by the automated loop videos creating module over a network.

According to another exemplary aspect of the present disclosure, receiving the user recorded one or more video segments by an automated loop videos processing module enabled in the server.

According to another exemplary aspect of the present disclosure, processing the user recorded one or more video segments to identify loop points and ensure smooth transitions by the automated loop videos processing module.

According to another exemplary aspect of the present disclosure, extracting one or more video frames into distinct foreground and background regions by the automated loop videos processing module.

According to another exemplary aspect of the present disclosure, identifying the similarity of foreground regions among the extracted one or more video frames by the automated loop videos processing module.

According to another exemplary aspect of the present disclosure, generating a final loop video by merging the user recorded one or more video segments using the identified similarity of foreground regions by the automated loop videos processing module.

According to another exemplary aspect of the present disclosure, transferring the final loop video to the computing device by the automated loop videos processing module over the network.

According to another exemplary aspect of the present disclosure, receiving the final loop video by the automated loop videos creating module and displays it to the user on the computing device.

According to another exemplary aspect of the present disclosure, enabling the user to edit and share the final loop video on the computing device by the automated loop videos creating module.

BRIEF DESCRIPTION OF THE DRAWINGS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

DETAILED DESCRIPTION OF EXAMPLE EMBODIMENTS

Figure 1:
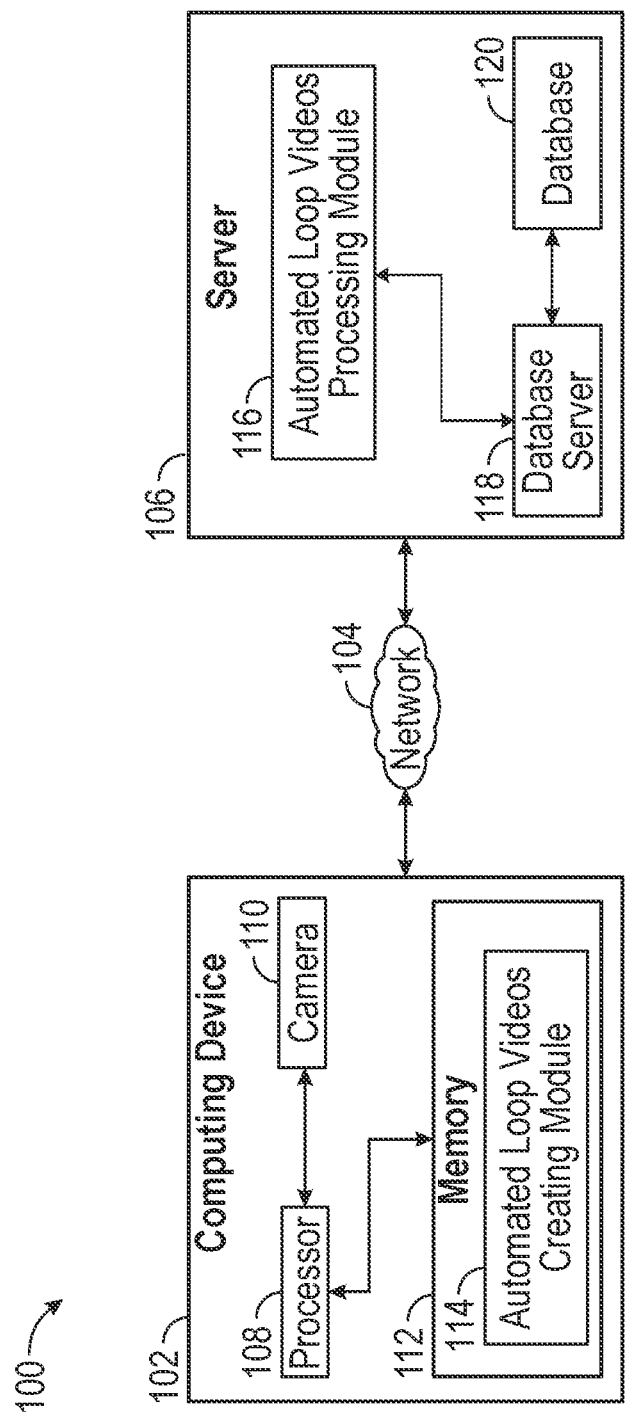
FIG. 1 is a block diagram depicting a schematic representation of a system for automatically creating loop videos, in accordance with one or more exemplary embodiments.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and so forth, herein do not denote any order, quantity, or importance, but rather are used to distinguish one element from another.

Referring to FIG. 1 is a block diagram 100 depicting a schematic representation of a system for automatically creating loop videos, in accordance with one or more exemplary embodiments. The system 100 includes a computing device 102, a network 104, a server 106, a processor 108, a camera 110, a memory 112, an automated loop videos creating module 114, an automated loop videos processing module 116, a database server 118, and a database 120.

The computing device 102 may include a user device. The user may include but not limited to professional artists, animators, photographers, video creators, content creators, and the like. The computing device 102 may include but not limited to, a personal digital assistant, smartphones, personal computers, a mobile station, computing tablets, a handheld device, an internet enabled calling device, an internet enabled calling software, a telephone, a mobile phone, a digital processing system, and so forth. The computing devices 102 may include the processor 108 in communication with a memory 112. The processor 108 may be a central processing unit. The memory 112 is a combination of flash memory and random-access memory.

The computing device 102 may be communicatively connected to the server 106 via the network 104. The network 104 may include, but not limited to, an Internet of things (IoT network devices), an Ethernet, a wireless local area network (WLAN), or a wide area network (WAN), a Bluetooth low energy network, a ZigBee network, a WIFI communication network e.g., the wireless high speed internet, or a combination of networks, a cellular service such as a 4G (e.g., LTE, mobile WiMAX) or 5G cellular data service, a RFID module, a NFC module, wired cables, such as the world-wide-web based Internet, or other types of networks may include Transport Control Protocol/Internet Protocol (TCP/IP) or device addresses (e.g. network-based MAC addresses, or those provided in a proprietary networking protocol, such as Modbus TCP, or by using appropriate data feeds to obtain data from various web services, including retrieving XML data from an HTTP address, then traversing the XML for a particular node) and so forth without limiting the scope of the present disclosure.

Although the computing device 102 is shown in FIG. 1, an embodiment of the system 100 may support any number of computing devices. The computing device 102 may be operated by the user. The computing device 102 supported by the system 100 is realized as a computer-implemented or computer-based device having the hardware or firmware, software, and/or processing logic needed to carry out the computer-implemented methodologies described in more detail herein.

In accordance with one or more exemplary embodiments of the present disclosure, the computing device 102 includes the camera 110 may be configured to enable the user to capture the multimedia objects using the processor 108. The multimedia objects may include, but not limited to short videos, videos, looping videos, and the like. The computing device 102 may include the automated loop videos creating module 114 in the memory 112.

The automated loop videos creating module 114 may be configured to enable the user to select music tracks on the computing device 102 to create loop videos. The automated loop videos creating module 114 may also be configured to enable the user to create or record video segments or upload pre-recorded video segments or photos on the computing device 102. The automated loop videos creating module 114 may be any suitable applications downloaded from GOOGLE PLAY® (for Google Android devices), Apple Inc.'s APP STORE® (for Apple devices), or any other suitable database. The automated loop videos creating module 114 may be a desktop application which runs on Windows or Linux or any other operating system and may be downloaded from a webpage or a CD/USB stick etc. In some embodiments, the automated loop videos creating module 114 may be software, firmware, or hardware that is integrated into the computing device 102. The computing device 102 may present a web page to the user by way of a browser, wherein the webpage comprises a hyper-link may direct the user to uniform resource locator (URL).

The server 106 may include the automated loop videos processing module 116, the database server 118, and the database 120. The automated loop videos processing module 116 may be configured to detect loop points on the user recorded video. The automated loop videos processing module 116 may also be configured to provide loop video templates to create automated loop videos. The automated loop videos processing module 116 may also be configured to provide server-side functionality via the network 104 to one or more users. The database server 118 may be configured to access the one or more databases. The database 120 may be configured to store user created and recorded videos. The database 120 may also be configured to store interactions between the modules of the automated loop videos creating module 114, and the automated loop videos processing module 116.

The computing device 102 may be configured to establish communication with the server 106 over the network 104. The computing device 102 may include the automated loop videos creating module 114. The automated loop videos creating module 114 may be configured to enable the user to access a special icon for using one or more pre-designed loop video templates, thereby redirecting the user to a track screen, and displaying a music tracks library to the user on the track screen. The automated loop videos creating module 114 may be configured to allow the user access and select a music track from the music tracks library. The automated loop videos creating module 114 may be configured to enable the user to record one or more video segments on the one or more pre-designed loop video templates. The automated loop videos creating module 114 may be configured to transfer the user recorded one or more video segments to the server 106 over the network 104. The server 106 may include the automated loop videos processing module 116. The automated loop videos processing module 116 may be configured to receive the user recorded one or more video segments. The automated loop videos processing module 116 may be configured to process the user recorded one or more video segments. The automated loop videos processing module 116 may be configured to extract one or more video frames into distinct foreground and background regions. The automated loop videos processing module 116 may be configured to identify the similarity of foreground regions among the extracted one or more video frames. The automated loop videos processing module 116 may be configured to generate a final loop video by merging the user recorded one or more video segments and transfers the final loop video to the computing device 102. The automated loop videos creating module 114 may be configured to receive the final loop video and displays to the user on the computing device 102. The automated loop videos creating module 114 may be configured to enable the user to edit and share the final loop video on the computing device 102.

Figure 2:
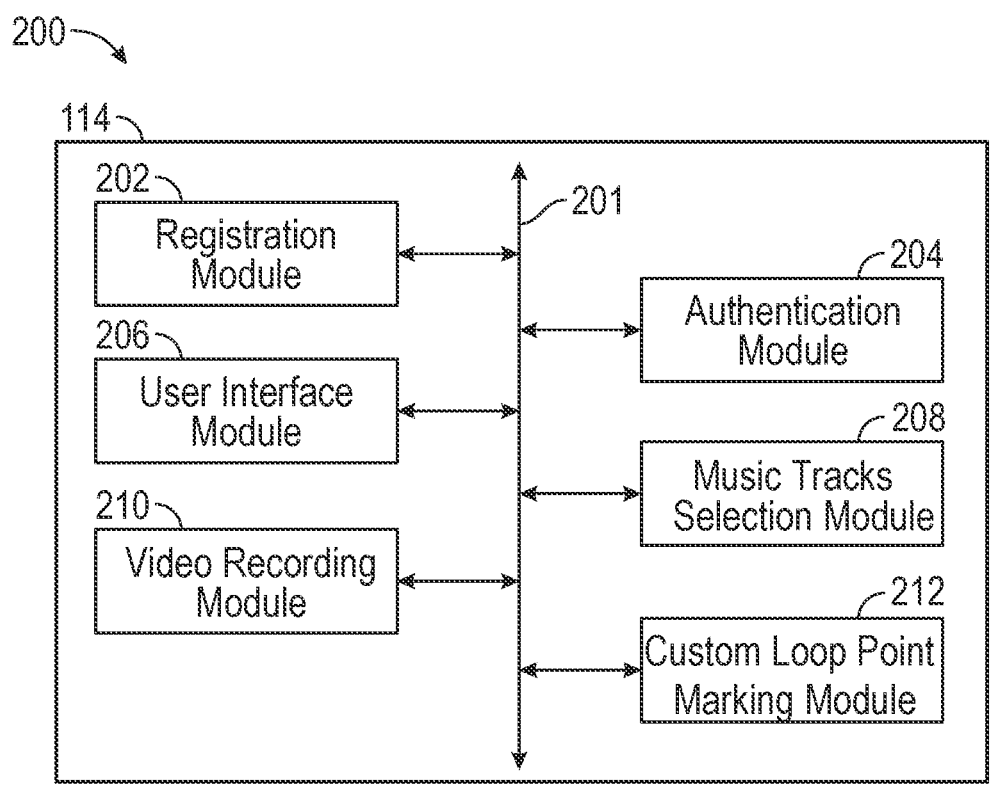
FIG. 2 is a block diagram depicting an embodiment of the automated loop videos creating module 114 on the computing device, in accordance with one or more exemplary embodiments.

Referring to FIG. 2 is a block diagram 200 depicting an embodiment of the automated loop videos creating module 114 on the computing device, in accordance with one or more exemplary embodiments. The automated loop videos creating module 114 includes a bus 201, a registration module 202, an authentication module 204, a user interface module 206, a music tracks selection module 208, a video recording module 210, and a custom loop point marking module 212. The bus 201 may include a path that permits communication among the modules of the automated loop videos creating module 114 installed on the computing device 102. The term "module" is used broadly herein and refers generally to a program resident in the memory 112 of the computing device 102.

The registration module 202 may be configured to enable the user to register on the automated loop videos creating module 114 installed on the computing device 102 by providing basic details of the user. The basic details may include but not limited to email, password, first and last name, phone number, address details, and the like. The registration module 202 may also be configured to transfer the user registration details to the server 106 over the network 104. The server 106 may include the automated loop videos processing module 116. The automated loop videos processing module 116 may be configured to receive the user registration details from the registration module 202. The authentication module 204 may be configured to enable the user to log in and access the automated loop videos creating module 114 installed on the computing device 102 by using the user login identity credentials. The user interface module 206 may be configured to enable the user to select pre-designed loop video templates. The user interface module 206 may also be configured to enable the user to select the pre-designed loop video templates that align with their desired content and intentions.

The music tracks selection module 208 may be configured to display the available music tracks on the track screen to the user. The music tracks selection module 208 may also be configured to enable the user to access the music tracks from third-party applications. The music tracks selection module 208 may also be configured to allow the user to access and select the music track for creating or recording the video segments. The video recording module 210 may be configured to enable the user to tap a camera icon on the computing device 102 to record the video segments using the music tracks. The video recording module 210 may also be configured to enable the user to upload pre-recorded videos on the computing device 102. The video recording module 210 may also be configured to enable the user to upload the videos stored from memory 112 of the computing device 102. The video recording module 210 may also be configured to enable the user to access pre-designed loop video templates for creating loop videos on the computing device 102. The video recording module 210 may also be configured to enable the user to record video segments on the pre-designed loop video templates. The video recording module 210 may also be configured to transfer the user recorded video segments to server 106. The video recording module 210 may also be configured to allow the user to record the complete scene corresponding to the pre-designed loop video templates multiple times.

The custom loop point marking module 212 may be configured to enable the user to mark their custom loop points on the recorded video. The custom loop point marking module 212 may also be configured to enable the user to mark loop points on the recorded video after selecting the music track from the music tracks library. The custom loop point marking module 212 may be configured to provide an intuitive interface where users can identify specific segments or moments in the video to set as loop points, giving them greater control and flexibility over the looping playback.

Figure 3:
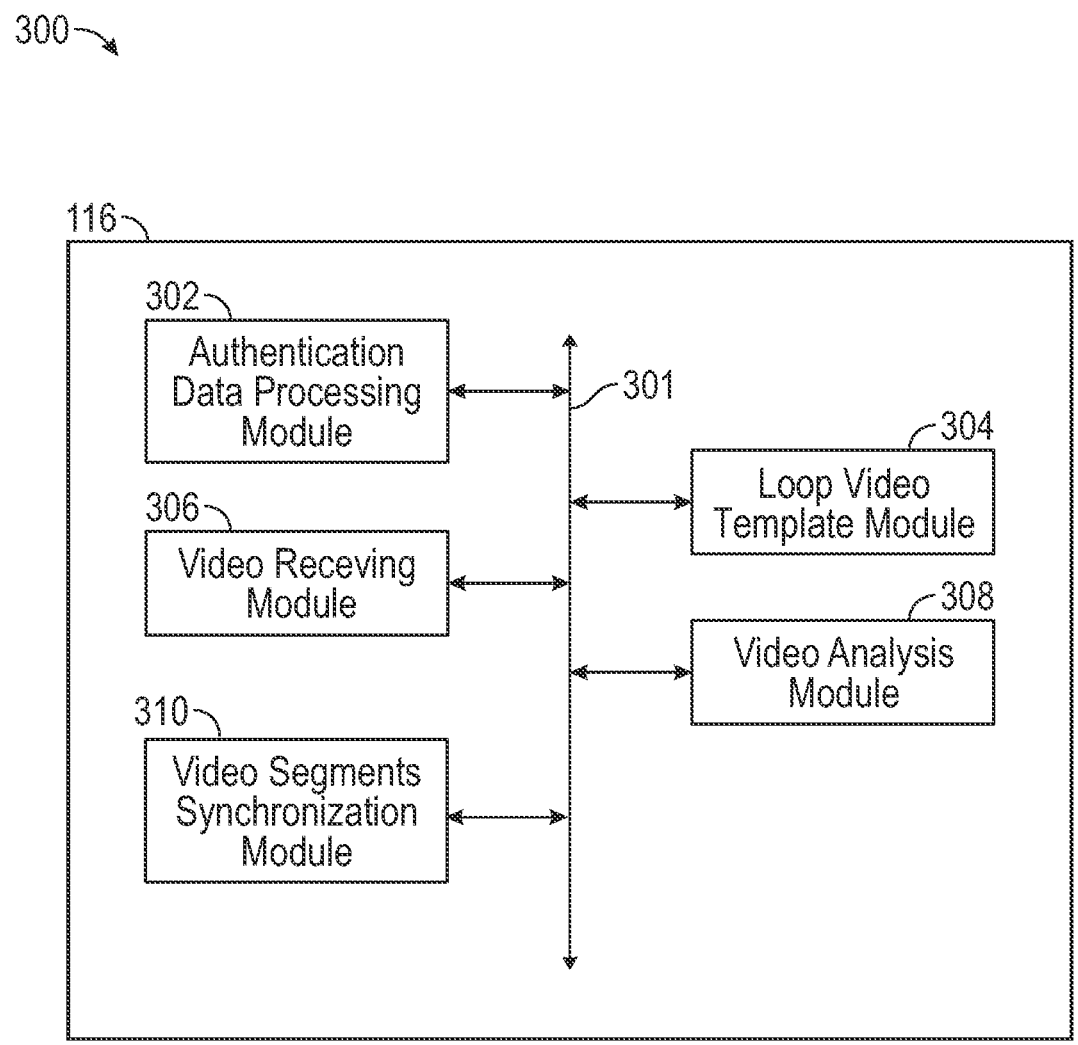
FIG. 3 is a block diagram depicting an embodiment of the automated loop videos processing module 116 on the server, in accordance with one or more exemplary embodiments.

Referring to FIG. 3 is a block diagram 300 depicting an embodiment of the automated loop videos processing module 116 on the server, in accordance with one or more exemplary embodiments. The automated loop videos processing module 116 include a bus 301, an authentication data processing module 302, a loop video template module 304, a video receiving module 306, a video analysis module 308, and a video segments synchronization module 310. The bus 301 may include a path that permits communication among the modules of the automated loop videos processing module 116 installed on server 106.

The authentication data processing module 302 may be configured to receive the user registration details from the registration module 202. The authentication data processing module 302 may also be configured to generate the user login identity credentials using the user registration details. The identity credentials comprise a unique identifier (e.g., a username, an email address, a date of birth, a house address, a mobile number, and the like), and a secured code (e.g., a password, a symmetric encryption key, biometric values, a passphrase, and the like). The loop video templates module 304 may be configured to generate and provide pre-designed loop video templates to the user. The pre-designed loop video templates may include various acts, performances, or scenarios suitable for looping. The video receiving module 306 may be configured to receive the user recorded video segments from the video recording module 210.

The video analysis module 308 may be configured to analyze the user recorded video segments to detect loop points on the user-recorded video segments. The video analysis module 308 may be configured to process the user recorded video segments to identify loop points and ensure smooth transitions. The video analysis module 308 may also be configured to extract video frames into distinct foreground and background regions. The video analysis module 308 may also be configured to identify the similarity of foreground regions among the extracted video frames. The video segments synchronization module 310 may be configured to generate a final loop video by merging the user recorded video segments using the identified similarity of foreground regions. In accordance with one or more exemplary embodiments of the present disclosure, pre-designed loop video templates automatically stop the recording of the video at the end points of the pre-designed loop video templates so that the user may continue recording the video in hands-free mode.

Figure 4:
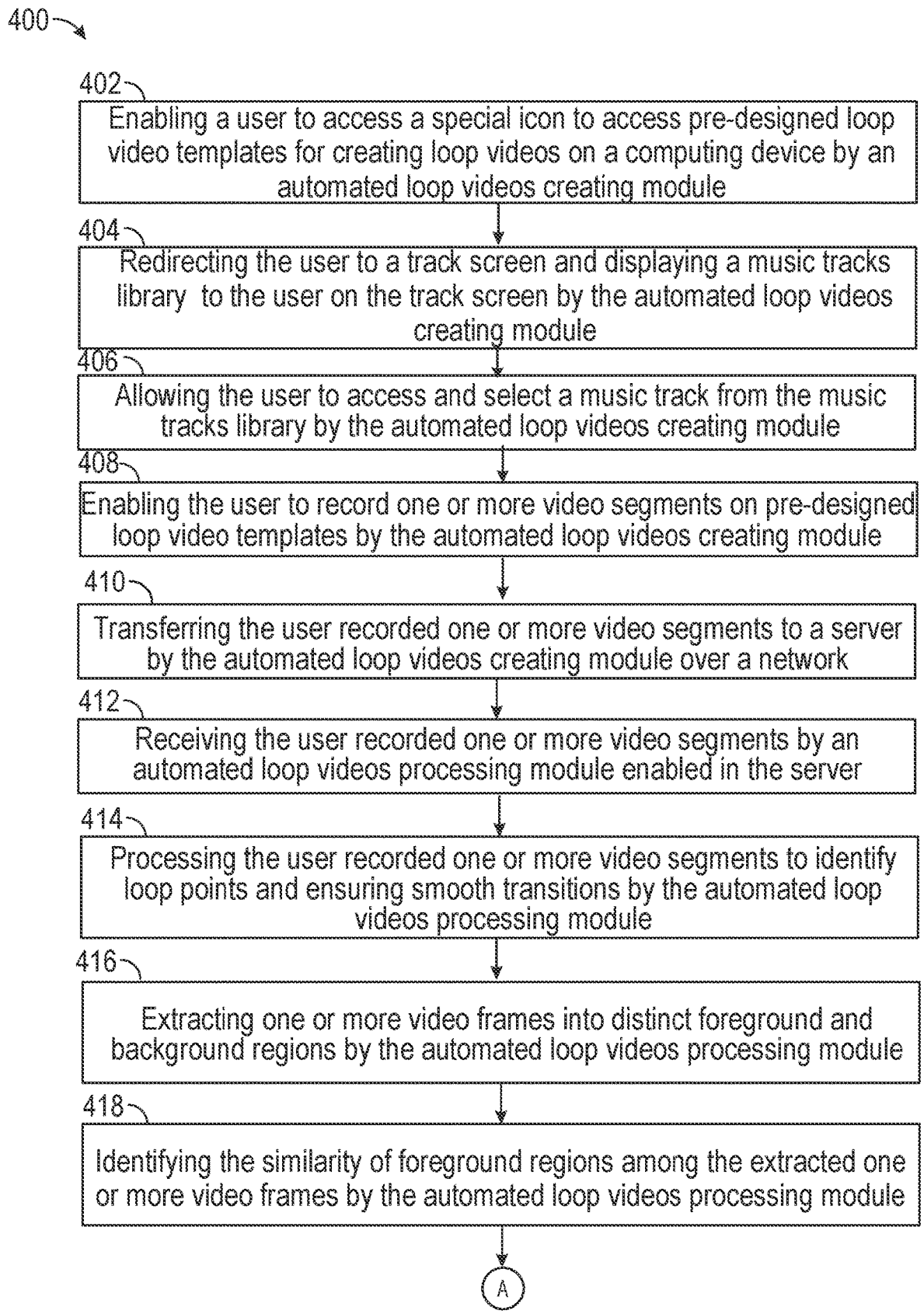
FIG. 4 is a flow diagram depicting a method for automatically creating loop videos, in accordance with one or more exemplary embodiments.
Figure 4:
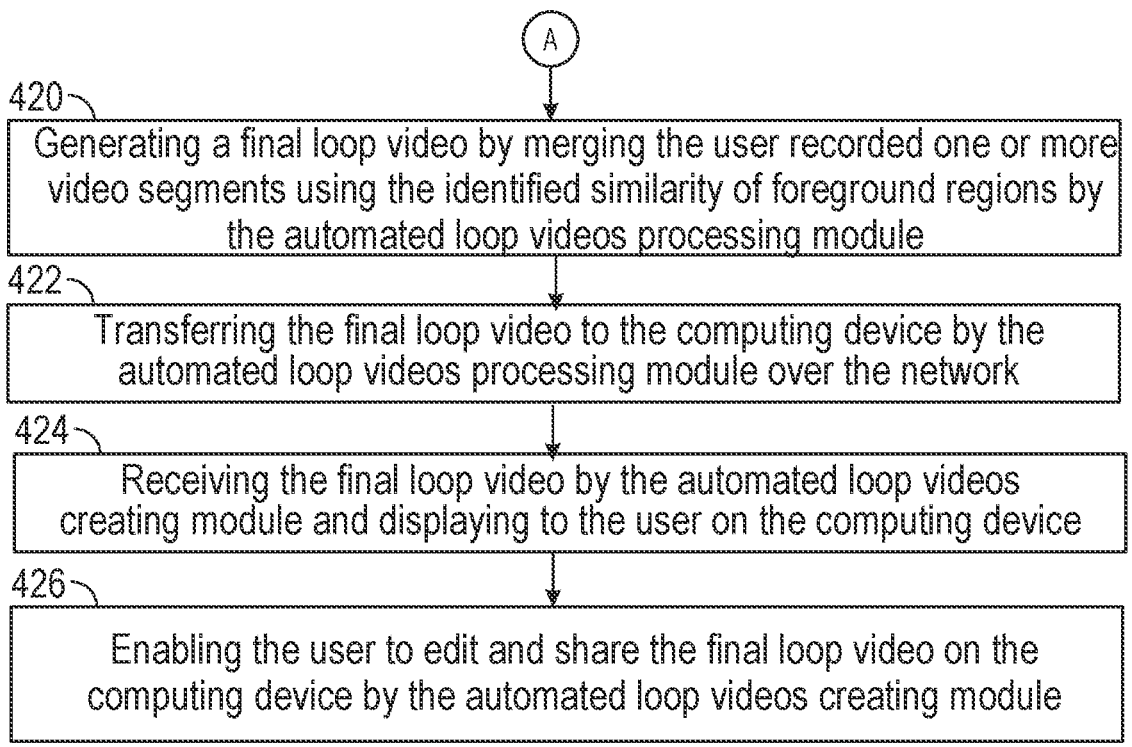

Referring to FIG. 4 is a flow diagram 400 depicting a method for automatically creating loop videos, in accordance with one or more exemplary embodiments. The method 400 may be carried out in the context of the details of FIG. 1, FIG. 2, and FIG. 3. However, the method 400 may also be carried out in any desired environment. Further, the aforementioned definitions may equally apply to the description below.

The method commences at step 402, enabling the user to access the special icon to access pre-designed loop video templates for creating loop videos on the computing device by the automated loop videos creating module. Thereafter at step 404, redirecting the user to the track screen and displaying the music tracks library to the user on the track screen by the automated loop videos creating module.

Thereafter at step 406, allowing the user to access and select the music track from the music tracks library by the automated loop videos creating module. Thereafter at step 408, enabling the user to record one or more video segments on the pre-designed loop video templates by the automated loop videos creating module. Thereafter at step 410, transferring the user recorded one or more video segments to the server by the automated loop videos creating module over the network. Thereafter at step 412, receiving the user recorded one or more video segments by an automated loop videos processing module enabled in the server. Thereafter at step 414, processing the user recorded one or more video segments to identify loop points and ensure smooth transitions by the automated loop videos processing module. Thereafter at step 416, extracting one or more video frames into distinct foreground and background regions by the automated loop videos processing module. Thereafter at step 418, identifying the similarity of foreground regions among the extracted one or more video frames by the automated loop videos processing module. Thereafter at step 420, generating a final loop video by merging the user recorded one or more video segments using the identified similarity of foreground regions by the automated loop videos processing module. Thereafter at step 422, transferring the final loop video to the computing device by the automated loop videos processing module over the network. Thereafter at step 424, receiving the final loop video by the automated loop videos creating module and displaying it to the user on the computing device. Thereafter at step 426, enabling the user edits and share the final loop video on the computing device by the automated loop videos creating module.

Figure 5:
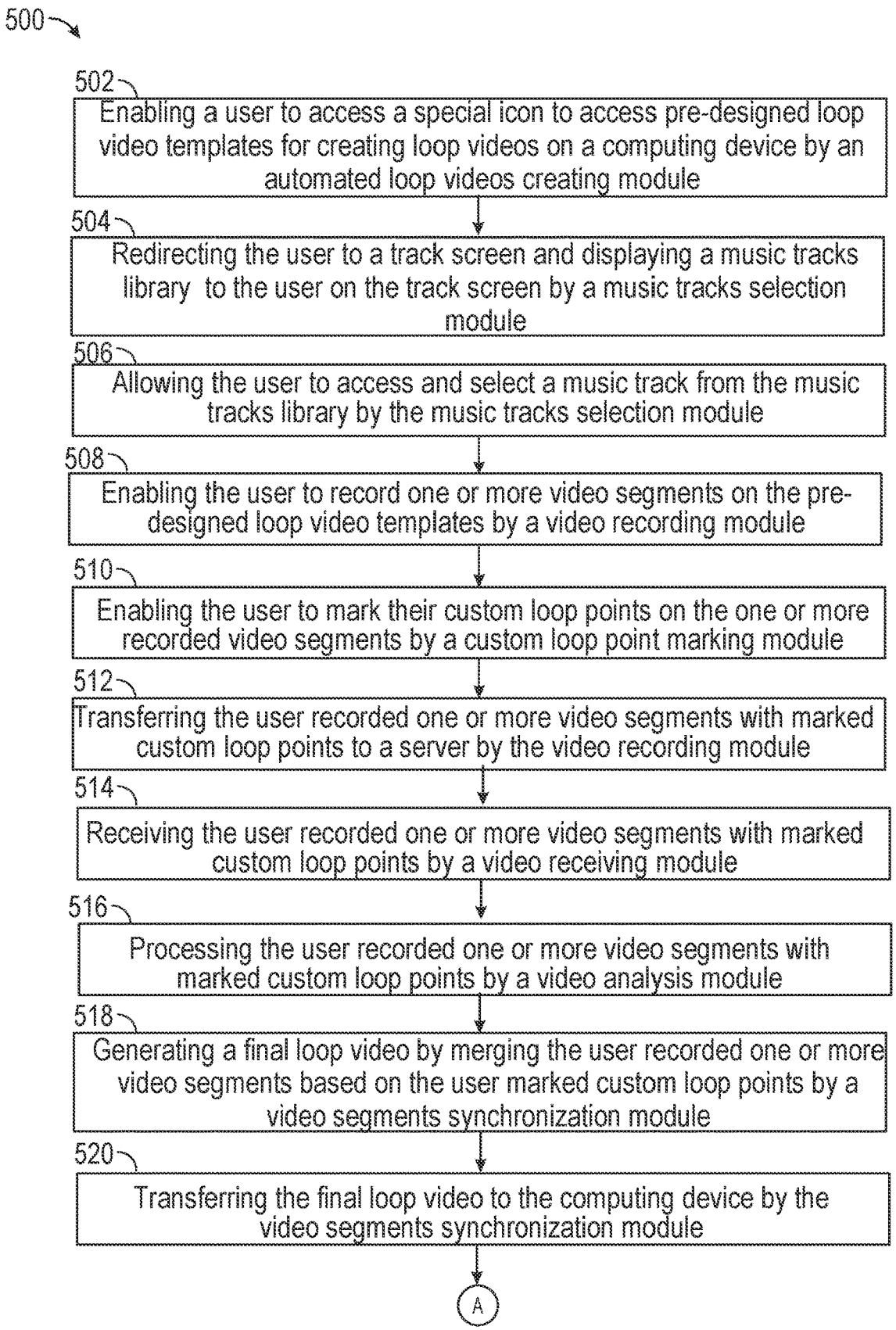
FIG. 5 is a flow diagram depicting a method for automatically creating loop videos using custom loop points, in accordance with one or more exemplary embodiments.
Figure 5:
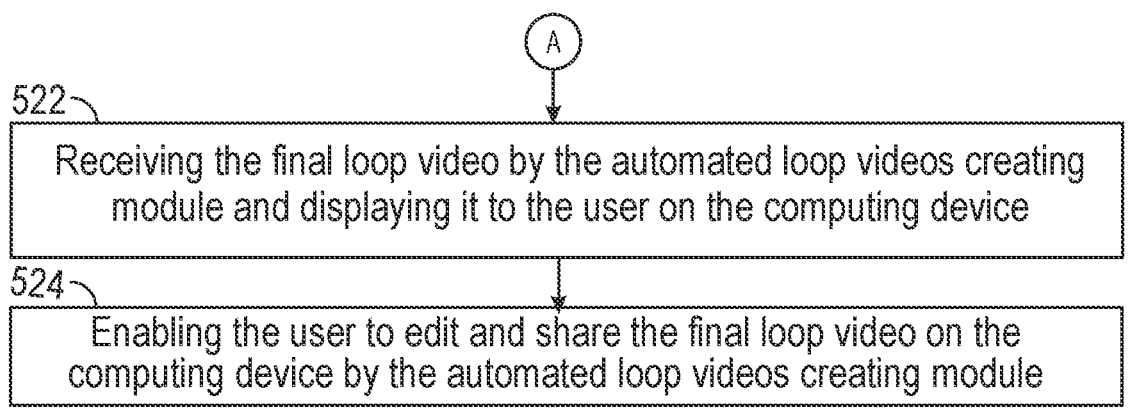

Referring to FIG. 5 is a flow diagram depicting a method for automatically creating loop videos using custom loop points, in accordance with one or more exemplary embodiments. The method 500 may be carried out in the context of the details of FIG. 1, FIG. 2, FIG. 3, and FIG. 4. However, the method 500 may also be carried out in any desired environment. Further, the aforementioned definitions may equally apply to the description below.

The method commences at step 502, enabling the user to access a special icon to access pre-designed loop video templates for creating loop videos on the computing device by an automated loop videos creating module. Thereafter at step 504, redirecting the user to the track screen and displaying a music tracks library to the user on the track screen by a music tracks selection module. Thereafter at step 506, allowing the user to access and select a music track from the music tracks library by the music tracks selection module. Thereafter at step 508, enabling the user to record one or more video segments on the pre-designed loop video templates by a video recording module. Thereafter at step 510, enabling the user to mark their custom loop points on the recorded video by a custom loop point marking module. Thereafter at step 512, transferring the user recorded one or more video segments with marked custom loop points to a server by the video recording module over a network. Thereafter at step 514, receiving the user recorded one or more video segments with marked custom loop points by a video receiving module. Thereafter at step 516, processing the user recorded one or more video segments with marked custom loop points by a video analysis module. Thereafter at step 518, generating a final loop video by merging the user recorded one or more video segments based on the user marked custom loop points by a video segments synchronization module. Thereafter at step 520, transferring the final loop video to the computing device by the video segments synchronization module. Thereafter at step 522, receiving the final loop video by the automated loop videos creating module and displaying it to the user on the computing device. Thereafter at step 524, enabling the user to edit and share the final loop video on the computing device by the automated loop videos creating module.

Figure 6:
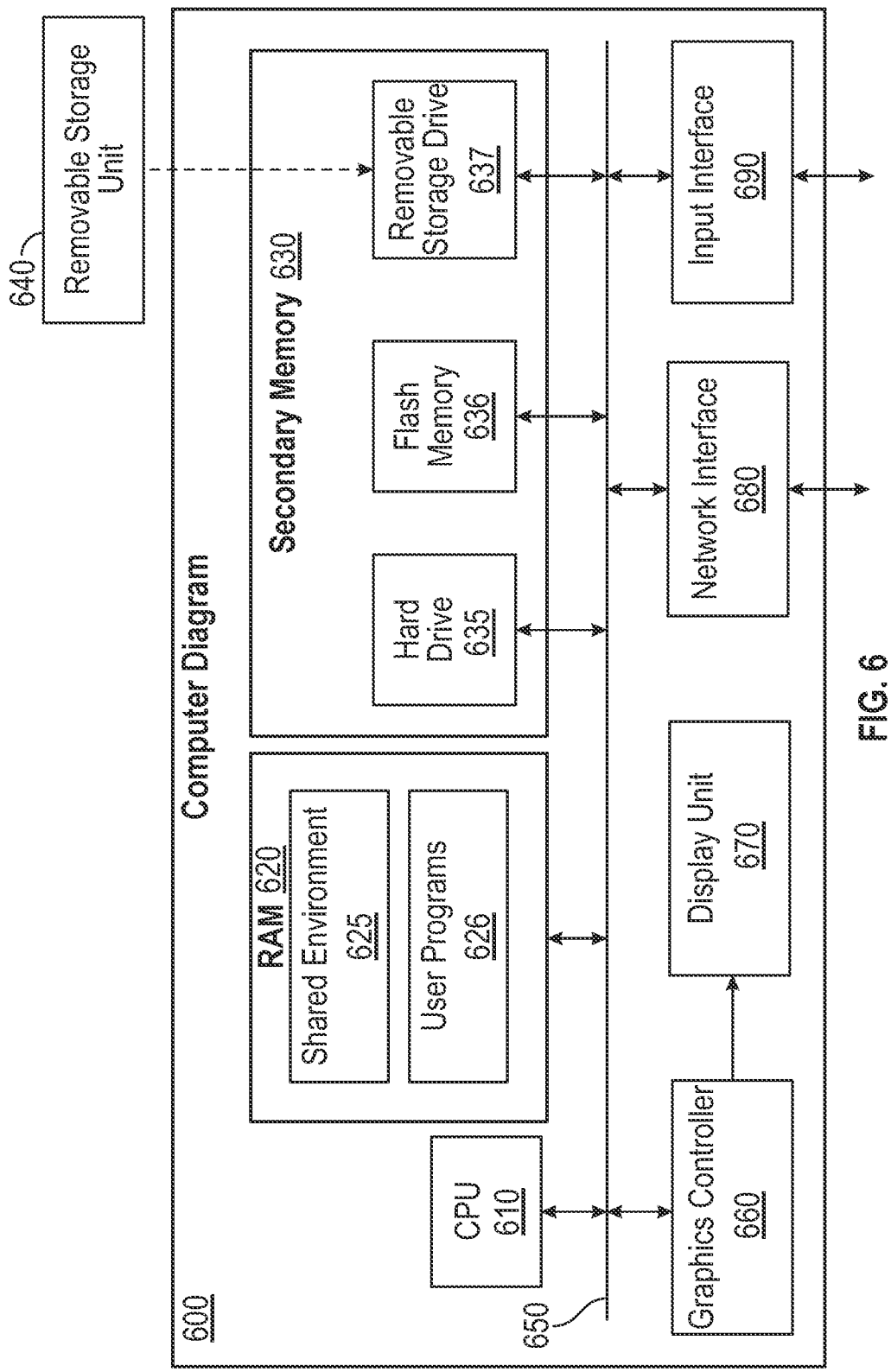
FIG. 6 is a block diagram illustrating the details of a digital processing system in which various aspects of the present disclosure are operative by execution of appropriate software instructions.

Referring to FIG. 6 is a block diagram 600 illustrating the details of a digital processing system 600 in which various aspects of the present disclosure are operative by execution of appropriate software instructions. The Digital processing system 600 may correspond to the computing device 102 (or any other system in which the various features disclosed above can be implemented).

Digital processing system 600 may contain one or more processors such as a central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present disclosure. CPU 610 may contain multiple processing units, with each processing unit potentially being designed for a specific task. Alternatively, CPU 610 may contain only a single general-purpose processing unit.

RAM 620 may receive instructions from secondary memory 630 using communication path 650. RAM 620 is shown currently containing software instructions, such as those used in threads and stacks, constituting shared environment 625 and/or user programs 626. Shared environment 625 includes operating systems, device drivers, virtual machines, etc., which provide a (common) run time environment for execution of user programs 626.

Graphics controller 660 generates display signals (e.g., in RGB format) to display unit 670 based on data/instructions received from CPU 610. Display unit 670 contains a display screen to display the images defined by the display signals. Input interface 690 may correspond to a keyboard and a pointing device (e.g., touch-pad, mouse) and may be used to provide inputs. Network interface 680 provides connectivity to a network (e.g., using Internet Protocol), and may be used to communicate with other systems (such as those shown in FIG. 1) connected to the network 104.

Secondary memory 630 may contain hard drive 635, flash memory 636, and removable storage drive 637. Secondary memory 630 may store the data software instructions (e.g., for performing the actions noted above with respect to the Figures), which enable digital processing system 600 to provide several features in accordance with the present disclosure.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EEPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 630. Volatile media includes dynamic memory, such as RAM 620. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus (communication path) 650. Transmission media can also take the form of acoustic or light waves, such as those generated during radio-wave and infra-red data communications.

According to an exemplary aspect of the present disclosure, enabling a user to access a special icon to access pre-designed loop video templates for creating loop videos on a computing device 102 by an automated loop videos creating module 114.

According to an exemplary aspect of the present disclosure, redirecting the user to a track screen and displaying a music tracks library to the user on the track screen by the automated loop videos creating module 114.

According to an exemplary aspect of the present disclosure, enabling allowing the user to access and select a music track from the music tracks library by the automated loop videos creating module 114.

According to an exemplary aspect of the present disclosure, enabling the user to record one or more video segments on the pre-designed loop video templates by the automated loop videos creating module 114.

According to an exemplary aspect of the present disclosure, transferring the user recorded one or more video segments to a server 106 by the automated loop videos creating module 114 over a network 104.

According to an exemplary aspect of the present disclosure, receiving the user recorded one or more video segments by an automated loop videos processing module 116 enabled in the server 106.

According to an exemplary aspect of the present disclosure, processing the user recorded one or more video segments to identify loop points and ensuring smooth transitions by the automated loop videos processing module 116.

According to an exemplary aspect of the present disclosure, extracting one or more video frames into distinct foreground and background regions by the automated loop videos processing module 116.

According to an exemplary aspect of the present disclosure, identifying the similarity of foreground regions among the extracted one or more video frames by the automated loop videos processing module 116.

According to an exemplary aspect of the present disclosure, generating a final loop video by merging the user recorded one or more video segments using the identified similarity of foreground regions by the automated loop videos processing module 116.

According to an exemplary aspect of the present disclosure, transferring the final loop video to the computing device by the automated loop videos processing module 116 over the network 104.

According to an exemplary aspect of the present disclosure, receiving the final loop video by the automated loop videos creating module 114 and displaying to the user on the computing device 102.

According to an exemplary aspect of the present disclosure, enabling the user to edit and share the final loop video on the computing device 102 by the automated loop videos creating module 114.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub-combinations of the various features described hereinabove as well as variations and modifications thereof, which would occur to persons skilled in the art upon reading the foregoing description.

What is claimed is:

1. A method for automatically creating loop videos, comprising:
    enabling a user to access a special icon to access one or more pre-designed loop video templates for creating loop videos on a computing device by an automated loop videos creating module;
    redirecting the user to a track screen and displaying a music tracks library to the user on the track screen by the automated loop videos creating module;
    allowing the user to access and select a music track from the music tracks library by the automated loop videos creating module;
    enabling the user to record one or more video segments on the one or more pre-designed loop video templates by the automated loop videos creating module;
    transferring the user recorded one or more video segments to a server by the automated loop videos creating module over a network;

receiving the user recorded one or more video segments by an automated loop videos processing module enabled in the server;

processing the user recorded one or more video segments to identify loop points and ensuring smooth transitions by the automated loop videos processing module;

extracting one or more video frames into distinct foreground and background regions by the automated loop videos processing module;

identifying the similarity of foreground regions among the extracted one or more video frames by the automated loop videos processing module;

generating a final loop video by merging the user recorded one or more video segments using the identified similarity of foreground regions by the automated loop videos processing module;

transferring the final loop video to the computing device by the automated loop videos processing module over the network;

receiving the final loop video by the automated loop videos creating module and displaying to the user on the computing device; and enabling the user to edit and share the final loop video on the computing device by the automated loop videos creating module.

2. The method of claim 1, comprising a step of displaying the one or more music tracks on the track screen after the user is redirected to the track screen by a music tracks selection module.

3. The method of claim 1, comprising a step of allowing the user to access and select the music track from the one or more music tracks by the music tracks selection module.

4. The method of claim 1, comprising a step of enabling the user to record one or more video segments on the one or more pre-designed loop video templates by a video recording module.

5. The method of claim 1, comprising a step of transferring the user recorded one or more video segments to the server by the video recording module over the network.

6. The method of claim 1, comprising a step of receiving the user recorded one or more video segments by a video receiving module.

7. The method of claim 1, comprising a step of processing the user recorded one or more video segments to identify loop points by a video analysis module.

8. The method of claim 1, comprising a step of extracting one or more video frames into distinct foreground and background regions by the video analysis module.

9. The method of claim 1, comprising a step of identifying the similarity of foreground regions from the extracted one or more video frames by the video analysis module.

10. The method of claim 1, comprising a step of generating a final loop video by merging the user recorded one or more video segments using the identified similarity of foreground regions by a video segments synchronization module.

11. The method of claim 1, comprising a step of transferring the final loop video to the computing device by the video segments synchronization module.

12. The method of claim 1, comprising a step of enabling the user to mark their custom loop points on the one or more recorded video segments by a custom loop point marking module.

13. The method of claim 1, comprising a step of transferring the user recorded one or more video segments with marked custom loop points to the server by the video recording module over the network.

14. The method of claim 1, comprising a step of receiving the user recorded one or more video segments with marked custom loop points by the video receiving module.

15. The method of claim 1, comprising a step of processing the user recorded one or more video segments with marked custom loop points by the video analysis module.

16. The method of claim 1, comprising a step of generating the final loop video by merging the user recorded one or more video segments based on the user marked custom loop points by the video segments synchronization module.

17. The method of claim 1, comprising a step of automatically stops the video recording at the endpoints of the pre-designed loop video templates.

18. The method of claim 1, comprising a step of allowing the user to record the one or more video segments repeatedly corresponding to the duration of the one or more pre-designed loop video templates.

19. A system for automatically creating loop videos, comprising:

a computing device configured to establish communication with a server over a network, whereby the computing device comprises an automated loop videos creating module configured to enable a user to access a special icon for using one or more pre-designed loop video templates, thereby redirecting the user to a track screen and displaying a music tracks library to the user on the track screen, the automated loop videos creating module configured to allow the user access and select a music track from the music tracks library and enable the user to record one or more video segments on the one or more pre-designed loop video templates, wherein the automated loop videos creating module configured to transfer the user recorded one or more video segments to the server over the network;

the server comprising an automated loop videos processing module configured to receive the user recorded one or more video segments, whereby the automated loop videos processing module configured to process the user recorded one or more video segments thereby, extracting one or more video frames into distinct foreground and background regions, the automated loop videos processing module configured to identify the similarity of foreground regions among the extracted one or more video frames thereby, generating a final loop video by merging the user recorded one or more video segments and transfers the final loop video to the computing device; and the automated loop videos creating module configured to receive the final loop video and displays to the user on the computing device, and the automated loop videos creating module configured to enable the user to edit and share the final loop video on the computing device.

20. A computer program product comprising a non-transitory computer-readable medium having a computer-readable program code embodied therein to be executed by one or more processors, said program code including instructions to:

enable a user to access a special icon to access one or more pre-designed loop video templates for creating loop videos on a computing device by an automated loop videos creating module;

redirect the user to a track screen and display a music tracks library to the user on the track screen by the automated loop videos creating module;

allow the user to access and select a music track from the music tracks library by the automated loop videos creating module;

enable the user to record one or more video segments on the one or more pre-designed loop video templates by the automated loop videos creating module;

transfer the user recorded one or more video segments to a server by the automated loop videos creating module over a network;

receive the user recorded one or more video segments by an automated loop videos processing module enabled in the server;

process the user recorded one or more video segments to identify loop points and ensure smooth transitions by the automated loop videos processing module;

extract one or more video frames into distinct foreground and background regions by the automated loop videos processing module;

identify the similarity of foreground regions among the extracted one or more video frames by the automated loop videos processing module;

generate a final loop video by merging the user recorded one or more video segments using the identified similarity of foreground regions by the automated loop videos processing module;

transfer the final loop video to the computing device by the automated loop videos processing module over the network;

receive the final loop video by the automated loop videos creating module and displaying to the user on the computing device; and enable the user to edit and share the final loop video on the computing device by the automated loop videos creating module.

* * * * *